(12) United States Patent
Biller et al.

(10) Patent No.: US 11,960,599 B2
(45) Date of Patent: Apr. 16, 2024

(54) CLASSIFYING USERS OF A DATABASE

(71) Applicant: International Business Machines Corporation, Armonk, NY (US)

(72) Inventors: Ofer Haim Biller, Neve Boker (IL); Oded Sofer, Midreshet Ben Gurion (IL)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 17/186,220

(22) Filed: Feb. 26, 2021

(65) Prior Publication Data

US 2022/0277074 A1 Sep. 1, 2022

(51) Int. Cl.
- G06F 11/34 (2006.01)
- G06F 17/14 (2006.01)
- G06F 18/214 (2023.01)
- G06F 21/55 (2013.01)
- G06N 20/00 (2019.01)

(52) U.S. Cl.
CPC ............ *G06F 21/552* (2013.01); *G06F 11/34* (2013.01); *G06F 11/3423* (2013.01); *G06F 17/14* (2013.01); *G06F 18/214* (2023.01); *G06N 20/00* (2019.01); *G06F 2201/80* (2013.01)

(58) Field of Classification Search
CPC ...... G06F 21/552; G06F 18/214; G06F 11/34; G06F 17/14; G06F 11/3423; G06F 2201/80; G06N 20/00
See application file for complete search history.

(56) References Cited

U.S. PATENT DOCUMENTS

| | | | |
|---|---|---|---|
| 10,922,307 B2 * | 2/2021 | Allgeier | G06F 16/2379 |
| 11,080,336 B2 * | 8/2021 | Van Dusen | G06Q 10/10 |
| 11,216,766 B2 * | 1/2022 | Khan | G06N 20/00 |
| 2006/0136370 A1 | 6/2006 | Buckler | |
| 2014/0122496 A1 * | 5/2014 | Stivoric | G16H 10/60 707/740 |
| 2015/0242531 A1 | 8/2015 | Rodniansky | |
| 2017/0214701 A1 * | 7/2017 | Hasan | H04L 63/1491 |
| 2017/0228821 A1 * | 8/2017 | Reimer | G06Q 10/063 |
| 2017/0255868 A1 * | 9/2017 | Gelinas | G06N 20/00 |

(Continued)

OTHER PUBLICATIONS

Oracle; Database 2 Day + Performance Tuning Guide; 4 Monitoring Real-Time Database Performance; https://docs.oracle.com/database/121/TDPPT/tdppt_realtime.htm#TDPPT517 ; Printed on Oct. 20, 2020.

(Continued)

*Primary Examiner* — Eliyah S. Harper
(74) *Attorney, Agent, or Firm* — Edward P. Li

(57) ABSTRACT

A computer-based system and method for classifying users of a database including obtaining an activity rate time series describing activity level of a database user versus time, extracting features from the activity rate time series, the features including a measure of repetition in the activity level, mean activity load and a percentage of the time in which the user is active, and determining a type of the database user based on the extracted at least one feature. The measure of repetition in the user activity is calculated by performing a Fourier transform on the activity rate time series to produce a transformed series; detecting spikes in the transformed series; and measuring a percentage of information in the transformed series which is included in the spikes.

18 Claims, 10 Drawing Sheets

(56) References Cited

U.S. PATENT DOCUMENTS

| | | | | |
|---|---|---|---|---|
| 2019/0227528 | A1* | 7/2019 | Abbott | G06N 20/00 |
| 2019/0236470 | A1* | 8/2019 | Chauhan | G06N 5/047 |
| 2019/0260795 | A1* | 8/2019 | Araiza | G06F 16/2455 |
| 2019/0340392 | A1* | 11/2019 | Khorrami | G06F 21/71 |
| 2020/0034336 | A1* | 1/2020 | Haddad | G06F 16/9035 |
| 2020/0167869 | A1* | 5/2020 | Magdelinic | G06Q 30/0206 |
| 2020/0336500 | A1* | 10/2020 | Urmanov | H04L 63/0815 |
| 2020/0364539 | A1* | 11/2020 | Anisimov | G06F 3/011 |
| 2021/0037044 | A1* | 2/2021 | Achanta | G06F 18/214 |
| 2021/0103708 | A1* | 4/2021 | Tanriover | G06K 7/10009 |
| 2021/0153752 | A1* | 5/2021 | Park | A61B 5/1176 |
| 2021/0174306 | A1* | 6/2021 | Martin | G06Q 10/105 |

OTHER PUBLICATIONS

Peter Mell and Timothy Grance ; The NIST Definition of Cloud Computing; Recommendations of the National Institute of Standards and Technology; Sep. 2011.

SAP HANA One Security Guide; https://help.sap.com/viewer/102d9916bf77407ea3942fef93a47da8/1.0.11/en-US/dec8d273bb571014b4c2b771d3e0f166.html ; Printed on Oct. 20, 2020.

Cheryl Tang ; Database Activity Monitoring: A Do's and Don'ts Checklist for DBAs; Imperva ; May 9, 2017 https://www.imperva.com/blog/database-activity-monitoring-checklist/.

Ajay Kulkarni ; What the heck is time-series data (and why do I need a time-series database)? Timescale; Nov. 19, 2018; http://timescale.com/what-the-heck-is-ime-senes-data-and-why-ie-Liged-a-iime-sernes-database-defa 118563.

Database Application Express User's Guide; Oracle; https://docs.oracle.com/cd/B32472_01/appdev.300/b32471/wrkspc.htm#BEJCBDGD ; Printed on Oct. 20, 2020.

IBM Guardium Data Protection for Databases; https://www.ibm.com/in-en/products/ibm-guardium-data-protection ; Printed on Oct. 20, 2020.

* cited by examiner

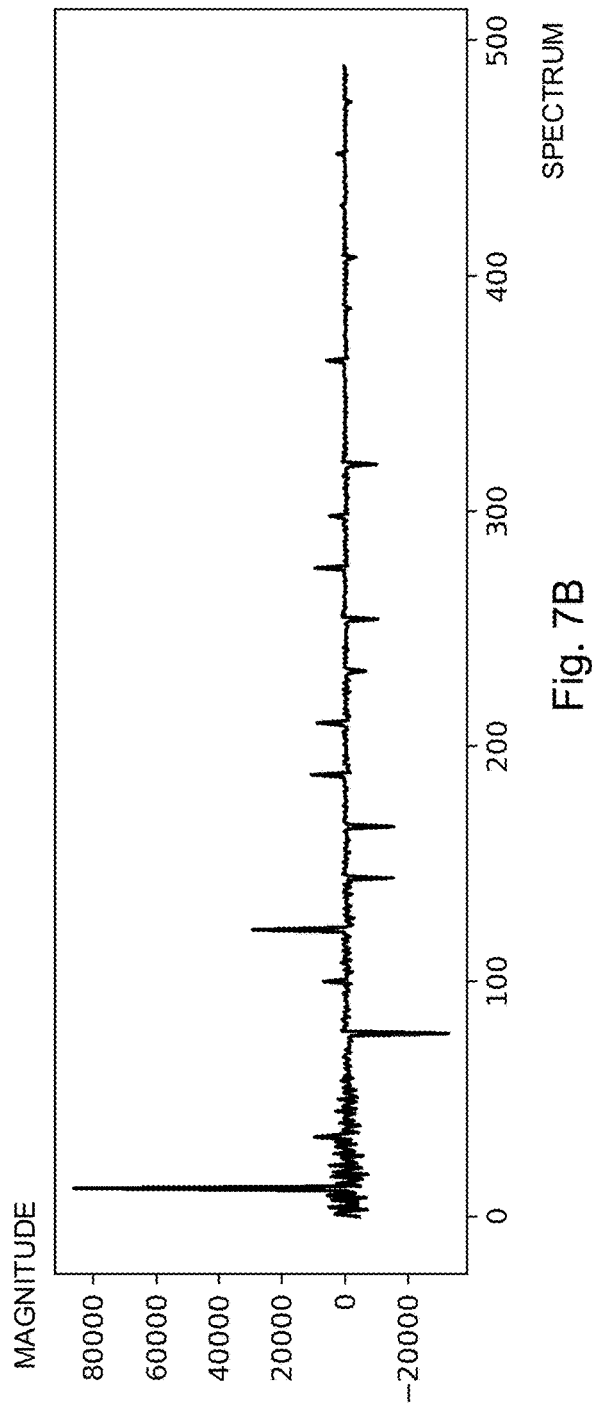
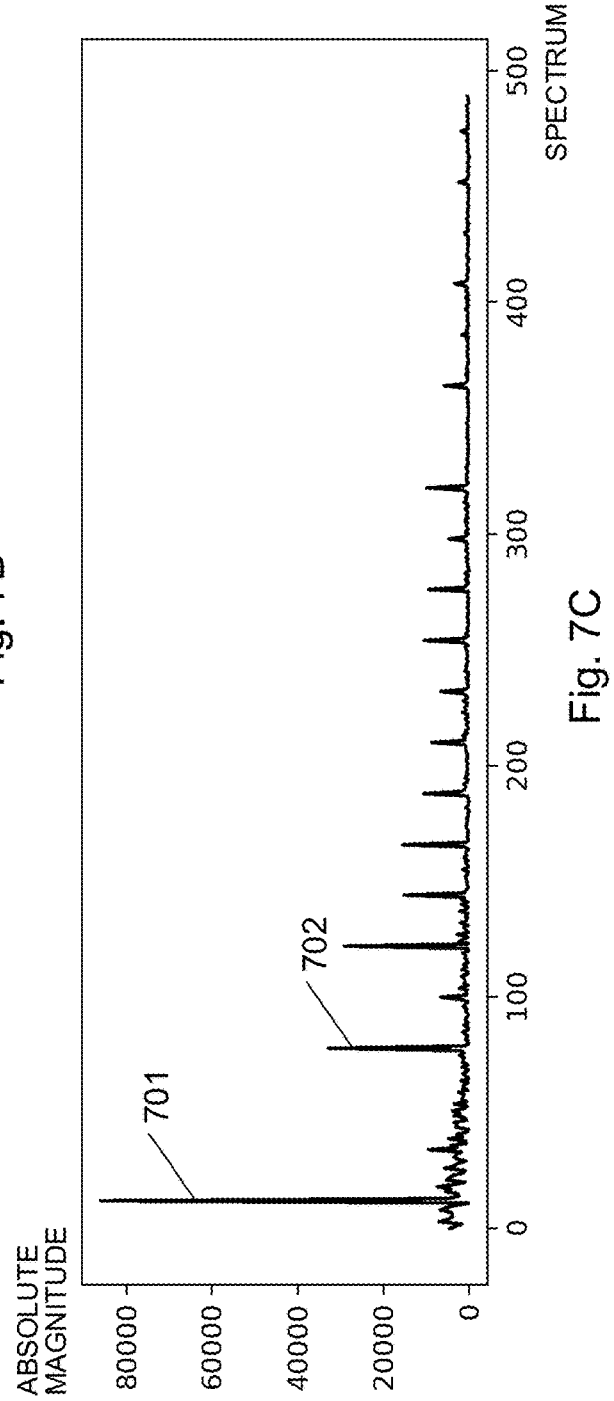

CLASSIFYING USERS OF A DATABASE

FIELD OF THE INVENTION

The present invention relates generally to classifying users of a database, and specifically, to classifying users of a database based on data profile.

BACKGROUND

A data protection and monitoring system may typically capture or sniff data accesses to a database (e.g., requests and responses) in real-time and analyze the data according to policy rules. The data protection and monitoring system may include a data activity monitor (DAM) and/or file activity monitor (FAM). The data protection and monitoring system may rely on policies to determine what data access to track, alert on and even block.

SUMMARY

According to embodiments of the invention, a system and method for classifying users of a database may include obtaining an activity rate time series describing activity level of a database user versus time; extracting at least one feature from the activity rate time series, wherein the at least one feature comprises a measure of repetition in the activity level; and determining a type of the database user based on the extracted at least one feature.

According to embodiments of the invention, the at least one feature may further include at least one of a mean activity load and a percentage of the time in which the user is active.

According to embodiments of the invention, the measure of repetition in the user activity may be calculated by performing a Fourier transform on the activity rate time series to produce a transformed series; detecting spikes in the transformed series; and measuring a percentage of information in the transformed series which is included in the spikes.

According to embodiments of the invention, the spikes may be detected by: applying a convolution with a smoothing kernel to the transformed series to produce a resultant series; and determining that a value in the transformed series is a spike if the resultant series is lower than the transformed series by a predetermined factor.

Embodiments of the invention may include obtaining a plurality of labeled activity rate time series; training a machine learning model using the labeled activity rate time series; and using the trained machine learning model to determine the type of the user based on the extracted features.

According to embodiments of the invention, the machine learning model may be a linear regression model.

Embodiments of the invention may include applying a first security policy if the user is a first type of user and a second security policy if the user is a second type of user.

Embodiments of the invention may include assigning a first significance level to security events associated with a first type of users and a second significance level to security events associated with a second type of user.

According to embodiments of the invention, determining the type of the database user may include determining if the user is a direct user or an application user, wherein the application user aggregates activity of multiple users of the application.

According to embodiments of the invention, a system and method for determining a type of a user of a database, may include obtaining a time series describing an activity volume of the user versus time; extracting a plurality of feature from the activity rate time series, wherein at least one feature comprises a measure of repetitive behavior of the user; and classifying the user to user types based on the extracted feature.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 7B depicts the Fourier transform of the first activity rate time series, according to embodiments of the invention;

FIG. 7C depicts the absolute value of the Fourier transform of the first activity rate time series, according to embodiments of the invention;

Figure 1:
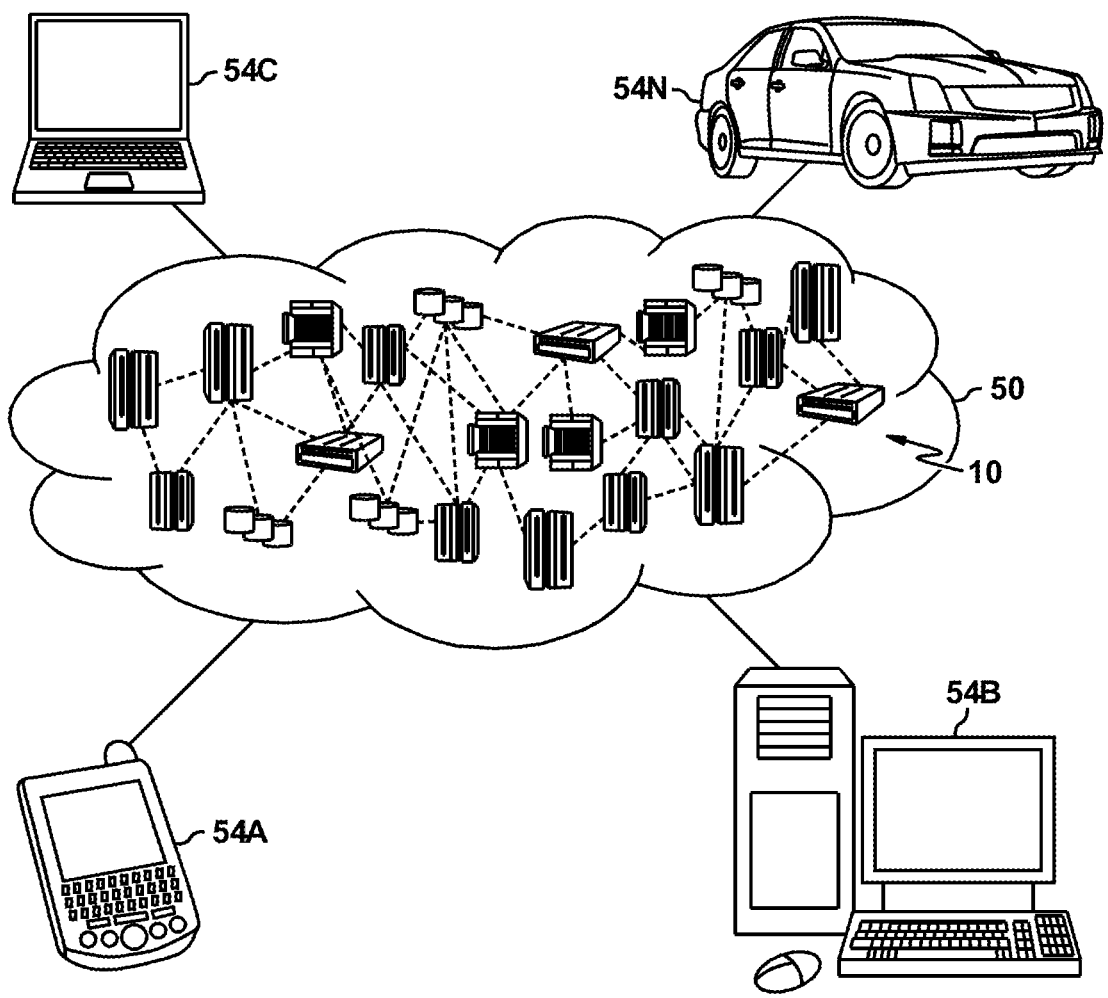
FIG. 1 depicts a cloud computing environment according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining", "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Accessing a database is typically performed via a database user, which is a software construct that may represent a single entity that is logged to the database and considered by the database as a single entity. Many applications that access a database, e.g., website applications, banking applications, customer relationship management (CRM) helpdesk applications etc. typically aggregate activity of multiple users of the application (e.g., multiple human operators who use the application) to a one or more database users and connect to the database using those database users. As known, applications may use shared-users and connection-pools to access the database. However, even when shared-users and connection-pools are used by an application, each database user in the connection pool is used by multiple users of the application. Thus, applications typically use a single database user for the activity of multiple application users. A database user that is used by an application to aggregate multiple users of an application may be referred to herein as an application database user, or simply as a database user. Other types of database uses may include a direct database user also referred to as a direct user, e.g., a person such as a system administrator accessing the database and a machine database user also referred to as a machine user, e.g., operations that are performed automatically by a service software or application.

Data protection and monitoring systems may rely on policies to determine what data access to track, alert on and even block. The policy rules may depend on the type of the user that access the database. However, current data protection and monitoring systems may find it difficult to differentiate between types of database users, e.g., between an application user, machine user and a direct user. Using command types used by the database user to determine whether the database user is an application user or not typically does not work since the applications may execute similar operations as the direct and machine users. Using metadata such as Client IP (client internet protocol address) or OS Users (operating system user) does not work as well since in many cases these parameters are not available or hard to be determined. Many algorithms exist for distinguishing between human users and machine users. However, application users are different from machine users and are harder to differentiate from direct users.

Embodiments of the invention may provide a system and method for classifying or determining a type of users of a database, and specifically for distinguishing between direct users and application users, and optionally machine users, based on features extracted from an activity rate time series describing activity level of a database user versus or measured against time. According to embodiments of the invention, at least one of the extracted features may relate to the amount of repetition in the activity rate time series of the database user. According to some embodiments, the level of repetition may be different between direct users, application users and machine users. For example, in many applications the activity level or rate of machine users may be highly repetitive, the activity level or rate of application users may be repetitive, but less than machine users, and direct users may be the least repetitive. According to embodiments of the invention, a machine learning model may obtain the extracted features and classify the database user based on the obtained features.

Distinguishing and identifying direct, machine and application users may enable adjusting the security policy for each user according to the user type. Thus, embodiments of the invention may improve the technology of data protection for databases by distinguishing between different types of database users and providing adjusted security policies for different types of users.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. An example cloud model includes for example five characteristics, at least three service models, and at least four deployment models.

Characteristics may be for example:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models may be for example:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database-as-a-Service (DBaaS): the capability provided to the consumer is to store data on a cloud infrastructure. DBaaS paradigm is a common approach for storing data in a cloud based computerized service, where users get access to data without the need for managing hardware or software.

Deployment Models may be for example:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Embodiments of the invention may provide a system and method to dynamic monitoring of movement of data, and specifically, to identifying movements of sensitive data in a computer system or network.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. Cloud computing environment is typically located remotely from its users. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

According to embodiments of the invention, the cloud consumers may include a data owner and the data client. For example, a data owner may store data in cloud computing environment 50 and a data client may retrieve data from cloud computing environment 50 using any of personal digital assistant (PDA) or cellular telephone 54A, desktop computer 54B, laptop computer 54C, automobile computer system 54N and/or any other type of computerized device.

Figure 2:
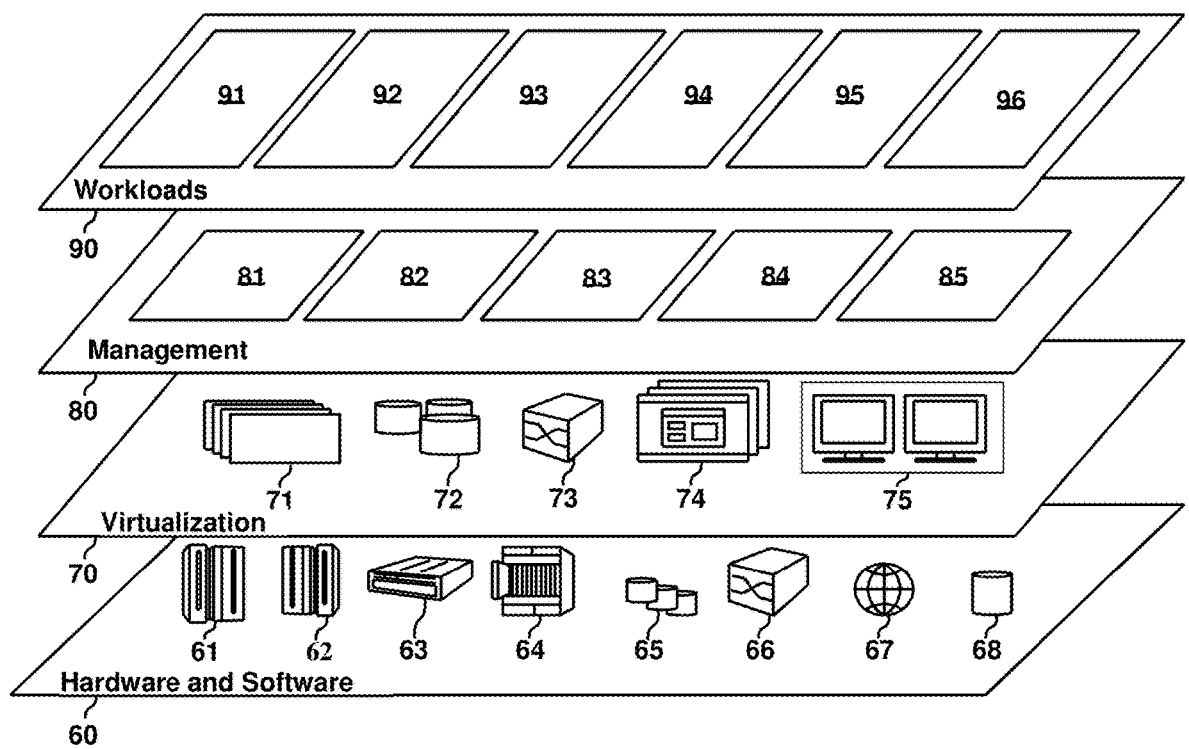
FIG. 2 depicts abstraction model layers according to an embodiment of the present invention.
Figure 9:
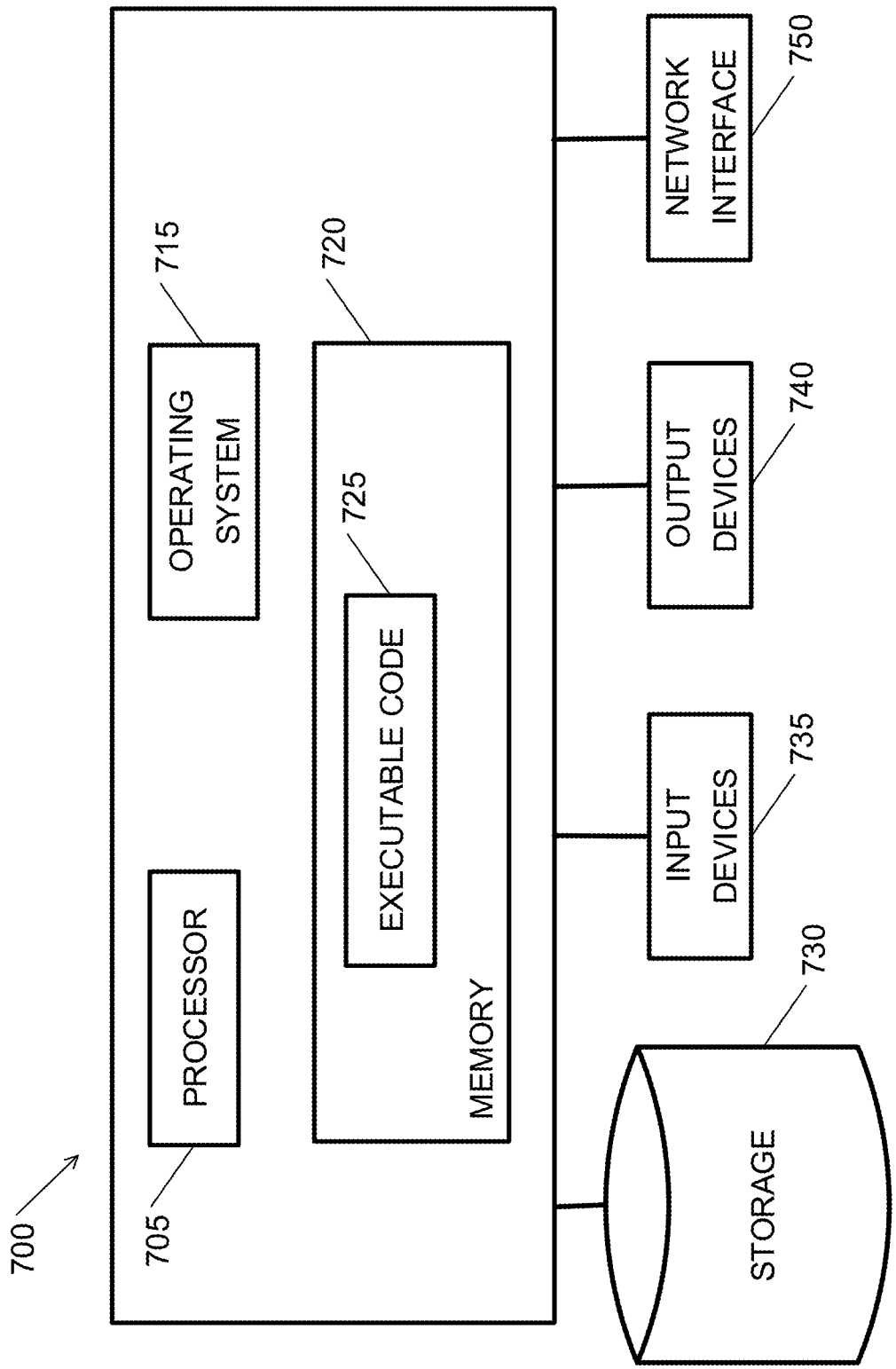
FIG. 9 illustrates an example computing device according to an embodiment of the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components, such as the hardware and software components depicted in FIG. 9. Examples of hardware components include: processors (e.g., processor 705 depicted in FIG. 9) such as mainframes 61, RISC (Reduced Instruction Set Computer) architecture based servers 62, servers 63 and blade servers 64; storage devices 65 (e.g., storage device 730 depicted in FIG. 9); and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

According to some embodiments, a monitored database may be implemented on virtual storage 72 and physically located on storage devices 65. The database may be managed by database software 68 that may include an agent software according to embodiments of the invention. A collector or a data security application may be implemented by software running on a virtual server 71. However, other architecture and hardware may be used.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
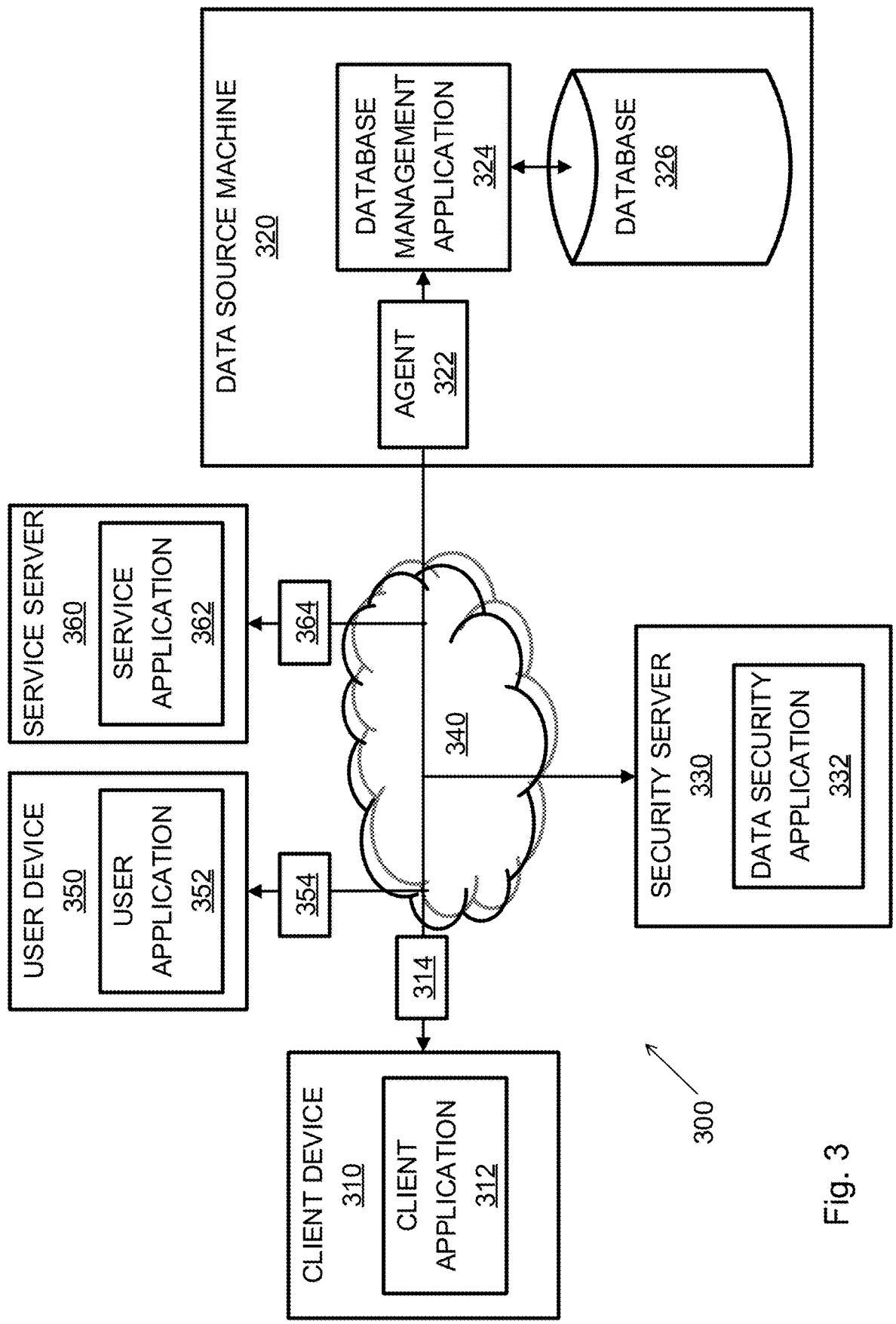
FIG. 3 depicts a computer network, according to embodiment of the invention.

Reference is made to FIG. 3, depicting a computer network or system 300, according to embodiment of the invention. According to some embodiments, security server 330 may be implemented on a virtual server 71 and data source machine 320 may be implemented on virtual storage 72, however, other implementations may apply. It should be understood in advance that the components, and functions shown in FIG. 3 are intended to be illustrative only and embodiments of the invention are not limited thereto.

Networks 340 may include any type of network or combination of networks available for supporting communication between client device 310, data source machine 320, security server 330, user device 350 and service server 360. Networks 340 may include for example, a wired, wireless, fiber optic, or any other type of connection, a local area network (LAN), a wide area network (WAN), the Internet and intranet networks, etc. Additionally or alternatively, any of client server 310, data source machine 320, security server 330, user device 350 and service server 360 may be connected to each other directly.

User device 350 may be any computing system used by a human operator to access data source machine 320, e.g., via a database user. User device 350 may operate user application 352 that may be used by the human operator to access data source machine 320 via the database user. A database user that is used by user device 350 or user application 352 to enable a single human operator to directly access data source machine 320, may be referred to herein as a direct user 354.

Service server 360 may be any computing system operating service application 362 which may operate automatic service actions, such as backup and other services, and may access data source machine 320, e.g., via a database user. A database user that is used by service server 360 or service application 362 to perform automatic operations and access t data source machine 320, may be referred to herein as a machine user 364.

According to some embodiments, a client application 312 running on client device 310 may communicate with data source machine 320, for example, via a database user. Client application 312 may aggregate activity of multiple users of client application 312 to a single database user and connect to data source machine 320 using the database user. A database user that is used by client device 310 or client application 312 to aggregate activity of multiple users of client application 312 to a single database user, may be referred to herein as an application user 314.

Each of client application 312, user application 352 and service application 362 may generate and submit data packets or data records including for example data access commands or database queries to data source machine 320, over an application user 314, direct user 354 and machine user 364, respectively. While a single client device 310, user device 350, service server 360 and data source machine 320 are shown in FIG. 3, one or more data source machines 320 may provide database services to one or more client devices 310, user devices 350 and service servers 360.

Data source machine 320 may include a database 326, (e.g., a database server or a relational database, a file server, etc.), or a combination of a database 326 and a proxy or network gate of database 326 and a database management application 324.

In one example, in response to a data access command from either client server 310, user device 350 or service server 360, database management application 324 may handle the data access command and generate a response for the data access command that is returned to client server 310, user server 330 or service server 360 in a database server response.

According to embodiments of the invention, agent 322 may capture or intercept a plurality of data packets flowing between data source machine 320 and data client 310, user device 350 or service server 360. The data packets may be captured in real-time substantially without adding latency or delay. According to some embodiments, agent 322 may decrypt the captured data packets to obtain a header of each data packet. Agent 322 may analyze the headers to determine security status of the data packet. For example, agent 322 may decrypt the header to obtain header information, including, for example, machine information, network information, user information, client information, etc. According to some embodiments, the user information may include a database user identifier (DB_user), which may enable agent 322 and other components of system 300 to associate a packet with a certain database user. However, the DB_user may not reveal the type of user served by this database user.

Agent 322 may apply header security rules on the header data and may classify the database user as disclosed herein, to obtain a security status or security policy of the data packet. Agent 322 may determine based on the security status whether the data packet should be blocked, should be allowed to flow without further analysis or whether further security analysis is required. For example, a header security rule may define that a data packets from a certain user should be blocked if a user is known as a malicious entity, should be allowed to flow without further analysis if the user is trusted, or should be further analyzed if the status of the user is not known. Other security rules or a combination of security rules may be used. Since the header structure is known, decrypting and analyzing the header may be performed in real-time without introducing significant delay.

According to embodiments of the invention, agent 322 may send a copy of data packet (e.g., as a mirror and send process) to security server 330 for a comprehensive security analysis.

Security server 330, also referred to as a collector, may implement a data security application 332. Data security application 332 may be or may include a firewall, a DAM and/or a FAM, an external database non-intrusive security mechanism (EDSM), enterprise database auditing, and real-time protection. Data security application 332 may provide a database activity monitoring service of data source machine 320, including performing a comprehensive security analysis. Data security application 332 may provide continuous monitoring of database activity of data source machine 320. Examples of data security application 332 may include, but are not limited to, the Guardium® application available from International Business Machines Corporation.

According to embodiments of the invention, data security application 332 may obtain data packets from agent 322 and perform comprehensive security analysis. The comprehensive security analysis may include parsing data access command included in the data packet to extract a template, metadata and data of the data access command, mapping metadata to data, building hierarchy of the data (e.g., building a hierarchical-tree of name-value), and processing policy rules.

According to some embodiments, data security application 332 may extract a data access command or response from the intercepted data packets, parse the extracted data access command or response to extract a template, metadata and data of the data access command and create a security construct according to database protocol rules. The database protocol rules may include or relate to, a type of operation or template identified in data access command, a database object to be operated on by the operation, and a database user identifier (DB_user) of the user requesting the query, identifiers for a service IP address, a client IP address, a client media access control (MAC), a network protocol used to access data, a database type, a service name for the name of a service providing data, a name of a database accessed, a source application used for the data access, an application user name, and operating system user, a database related field, an error code, an exception type, a service IP address of the location of data accessed, and additional or alternate rules.

According to some embodiments, data security application 332 may validate a possible database object access violation in the security construct against security policies defined by the policy rules. In one example, if the security construct does not validate against the security policies, e.g., if the security construct violates the policy rules, data security application 332 may issue an alert to an administrator or other entity indicating that the intercepted data packet has failed to validate against the security rules. In one example, an administrator or service may set each of the rules. According to some embodiments, the security rules may include one or more settings such as, but not limited to, an operation type setting specifying the type of operation access is or is not allowed for, an object setting specifying one or more particular database objects being acted upon by the operation, and a user setting specifying one or more user identifiers for users requesting the operation on the database object. For example, operations that may be restricted by the security rules may include operations such as, but not limited to, create, select, update and delete. The security settings may include additional or alternate types of settings.

According to some embodiments, the security policies and policy rules that are used or applied depend on the type of database user accessing the database. For example, a first set of security policies and policy rules may be required for monitoring application users 314, while a second set of security policies and policy rules may be required for monitoring direct users 354, and other security policies and policy rules may be required for monitoring other types of database users. Similarly, a first significance level may be assigned to security events associated with application users 314, a second significance level may be assigned to security events associated with a direct users 354, and other significance levels may be assigned to security events associated with a other users.

Each of client server 310, security server 330, user device 350 and service server 360 may be or may include a computing device such as computing device 700 depicted in FIG. 9. One or more databases 326 may be or may include a storage device such as storage device 730.

Figure 4:
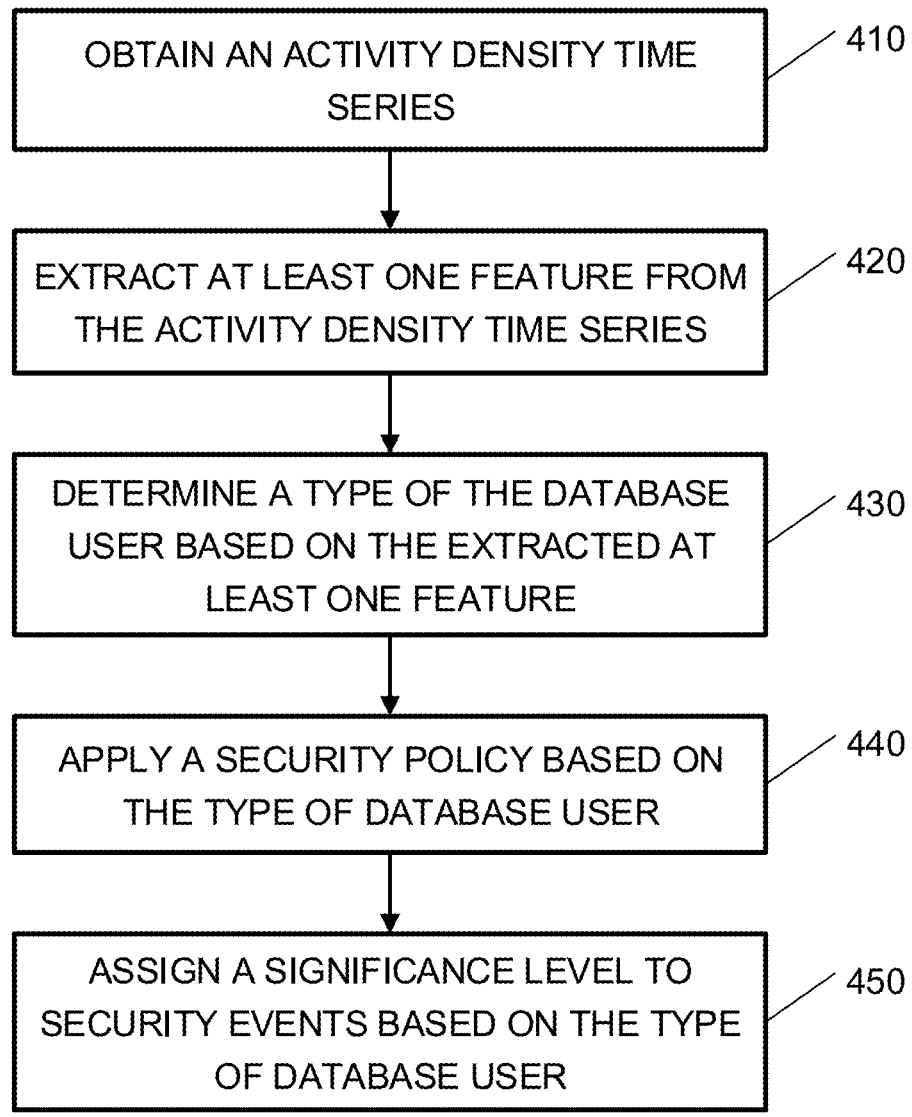
FIG. 4 is a flowchart of a method for classifying users of a database, according to embodiments of the invention.

Reference is made to FIG. 4, which is a flowchart of a method for classifying users of a database, according to embodiments of the invention. An embodiment of a method for classifying users of a database may be performed, for example, by the systems shown in FIGS. 1, 2, 3 and 7.

In operation 410, a processor, a processor included in agent 322 or in security server 330, may obtain an activity rate time series (also referred to as activity density time series) describing activity level of a database user versus time. For example, the activity rate time series may include the number of commands or events (or an estimation of the number of commands or events) sent over the database user to data source machine 320 and captured by agent 322 versus time, e.g., the number of commands sent over a database user (e.g., anyone of application user 314, direct user 354 and machine user 364 or other database users) each second. In some embodiments, the activity rate time series may include the number of packets or the amount of data, e.g., in bits or bytes etc., sent over the database user to data source machine 320 and captured by agent 322 versus time. A time series, or a measure versus time, may include for example a set of timestamps or time instances, each associated with an activity rate such as a number of commands, or a graph of activity at a series of times. Other measurements of activity versus time may be used.

In operation 420, the processor may extract at least one feature from the activity rate time series. In some embodiments, at least one of the extracted features may include a measure of repetition in the activity level in the activity rate time series. In some embodiments, the feature representing a measure of repetition in the activity rate time series may be extracted by performing a Fourier transform on the activity rate time series as disclosed herein. In some amendments, the activity rate time series may be smoothed, e.g., using a low-pass filter such as exponential smoothing or sliding window of around 30 minutes before or as a part of feature extraction.

According to some embodiments, other features may include mean activity load, and activity ratio. The mean activity load may relate to a mean or average volume e.g., the mean number of commands, events, packets, bits or bytes, etc. sent by the database user to data source machine 320 in a larger time window than the time resolution of the activity rate time series, e.g., one hour, one day etc. The activity ratio may relate to a ratio or percentage of the time in which the user is active in a given time window, e.g., the ratio of the time in which the user is active in one hour, one day, one week, etc. Other features may be extracted. In operation 430, the processor may determine a type of the database user based on the extracted at least one feature. In some embodiments, the processor may determine a type of the database user based on one or more of the measure of repetition, mean activity load, and activity ratio. More or other features may be used.

In some embodiments the processor may determine a type of the database user using a formula and/or logic operation performed on the extracted features. For example, certain levels of the extracted parameters may be associated with application users, others with machine users and others with direct users. In some embodiments, the processor may determine a type of the database user using machine learning model or algorithm, as disclosed herein. In some embodiments, the processor may classify the database user to user types based on the extracted features, e.g., using a classification algorithm.

In operation 440, the processor may apply security policy to the intercepted data packets based on the user type determined in operation 430. For example, the processor may apply a first security policy if the user is a direct user 354, a second security policy if the user is an application user 314, a third security polity if the user is a machine user 364, and other security polity for other types of database users. In operation 450, the processor may assign a significance level to the security events based on the user type determined in operation 430. For example, the processor may assign a first significance level to security events associated with a direct user 354, a second significance level to security events associated with an application user 314, a third significance level to security events associated with a machine user 364, and other significance level to security events associated with other types of database users. For example, a specific data access command may be perfectly normal for a direct user but highly suspicious for an application user, and vice versa. Thus, the same data access command may be allowed if used by a direct user but blocked if used by an application user. Similarly, a security event may be assigned a low significance level if associated with a direct user and a high significance level if associated with an application user.

For example, in a banking system, a command for changing a balance in bank account may be normal and acceptable for application user 314, but highly suspicious if used by a direct user 354. Thus, agent 322 may block a command to change a balance in bank account coming from a database user that is identified, e.g., in operation 430, as a direct user 354 and allow a similar command coming from application user 314.

Figure 5:
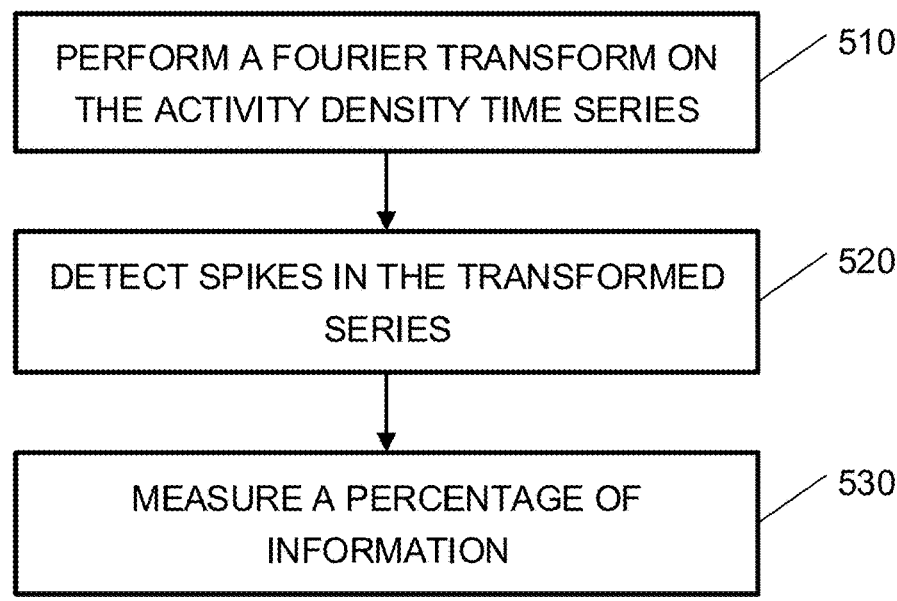
FIG. 5 is a flowchart of a method for calculating a measure of repetition in the user activity, according to embodiments of the invention.

Reference is made to FIG. 5, which is a flowchart of a method for calculating a measure of repetition in the user activity, according to embodiments of the invention. An embodiment of a method for calculating a measure of repetition in the user activity may be performed, for example, by the systems shown in FIGS. 1, 2, 3 and 7.

In operation 510, the processor may perform a Fourier transform on the activity rate time series to produce a transformed series. In operation 520, the processor may detect spikes in the transformed series. The spikes in the transformed series may represent repetition in the time series data. In some embodiments, the spikes may be detected by applying a convolution with a smoothing kernel, e.g., a Gaussian kernel, to absolute values of the transformed series to produce a smoothed series and determining that a value in the transformed series is a spike if the smoothed series is lower than the transformed series by a predetermined factor. Using embodiments of this method, a sharper peak would be lowered by the convolution more than a peak that is not as sharp. Assuming that the non-sharp peaks are not good indication of repetition in the activity rate time series, embodiments of this method may enable filtering out the not-so-sharp peaks. In some embodiments, a point x(t) in the absolute value of the transformed series may represent a spike if $x(t) > c*smooth(x(t))$, where $smooth(x(t))$ is the smoothed series and c is the predetermined factor. Other methods may be used to detect spikes.

In operation 530, the processor may measure a percentage or ratio of information in the transformed series which is included the spikes. The measure of repetition may equal the percentage or ratio of information in the transformed series which is included the spikes.

Figure 6:
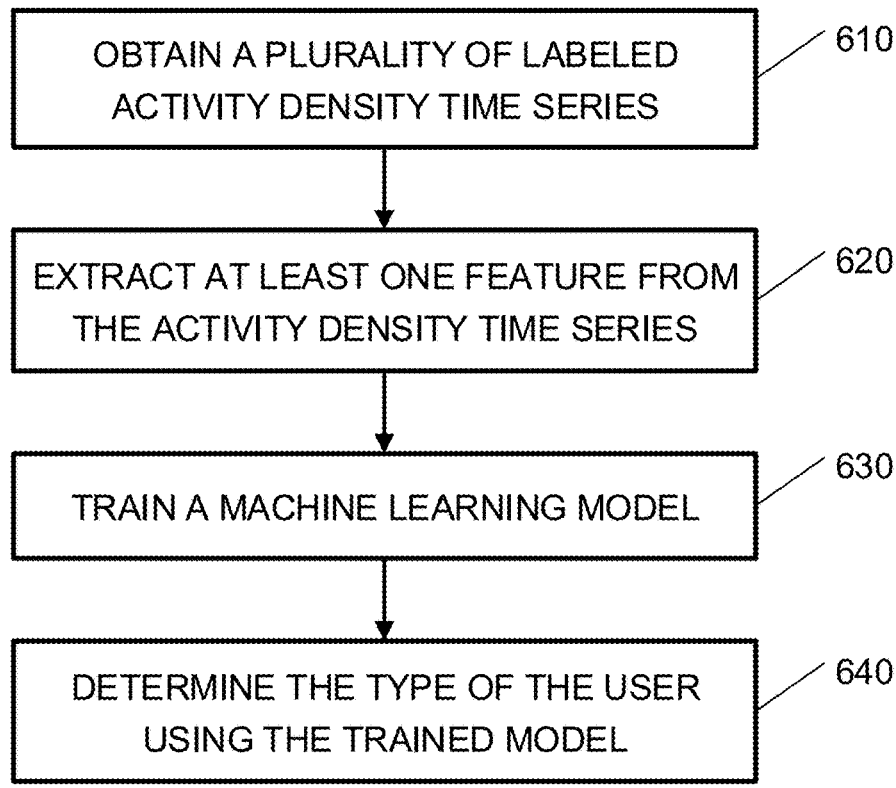
FIG. 6 is a flowchart of a method for determining the type of the user using a trained machine learning model, according to embodiments of the invention.

Reference is made to FIG. 6, which is a flowchart of a method for determining the type of the user using the trained ML model, according to embodiments of the invention. An embodiment of a method for determining the type of the user using the trained ML model may be performed, for example, by the systems shown in FIGS. 1, 2, 3 and 7.

In operation 610, the processor may obtain a plurality of labeled activity rate time series. The activity rate time series may include a plurality of activity rate time series of each type of user that the system should identify. For example, if the system should identify or classify direct users and application users, then the processor may obtain a plurality of activity rate time series of direct users labeled as such, and a plurality of activity rate time series of application users labeled as such. The labeled activity rate time series may be labeled by a human operator. In operation 620, the processor may extract at least one feature from the activity rate time series. For example, the processor may extract the same type of features as in operation 420.

In operation 630, the processor may train a ML model using the labeled activity rate time series. The ML model or algorithm may include a supervised classification algorithm such as neural networks (NN), support vector machines (SVM), linear regression, logistic regression, naive Bayes, linear discriminant analysis, decision trees, k-nearest neighbor algorithm, similarity learning, etc. In operation 640, the processor may use the trained machine learning model to determine the type of the user based on the extracted features.

Figure 7A:
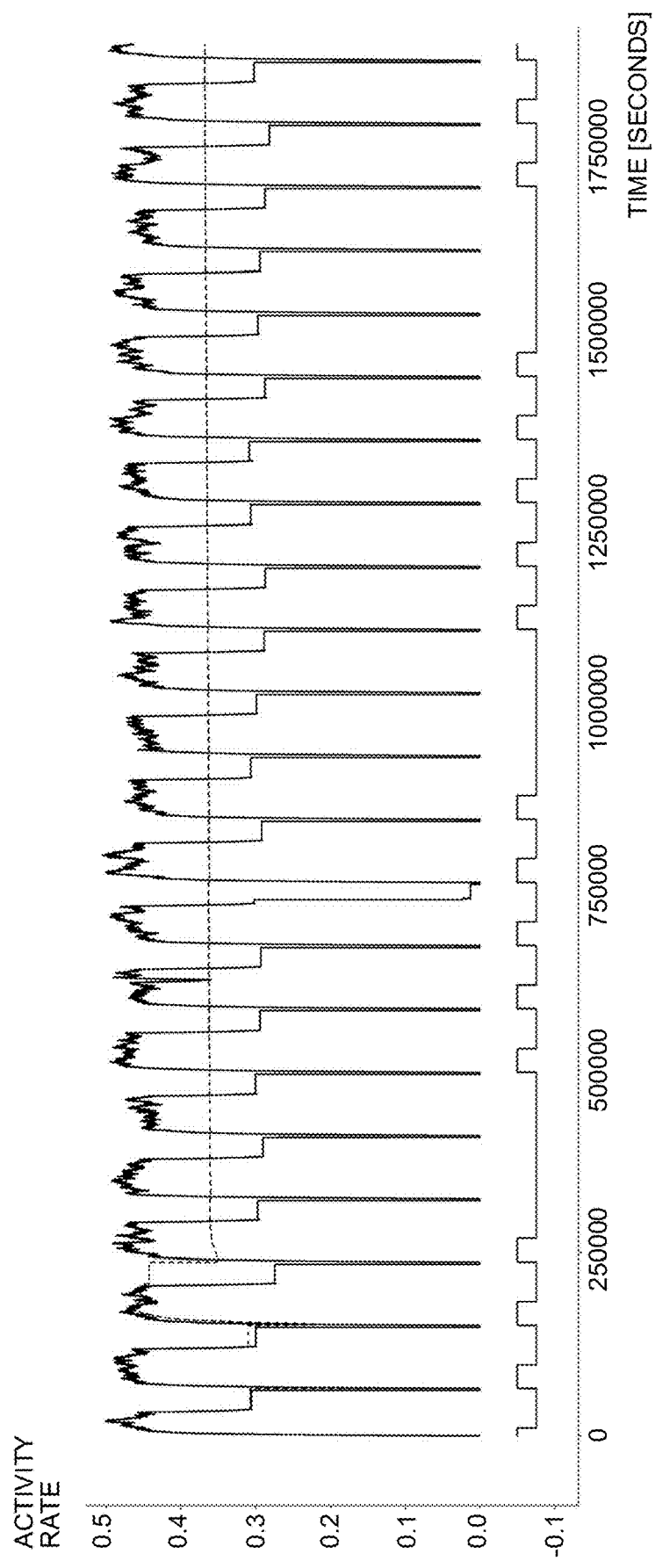
FIG. 7A depicts an example a first activity rate time series and mean activity load feature extracted from the activity rate time series of a database user, according to embodiments of the invention.
Figure 8A:
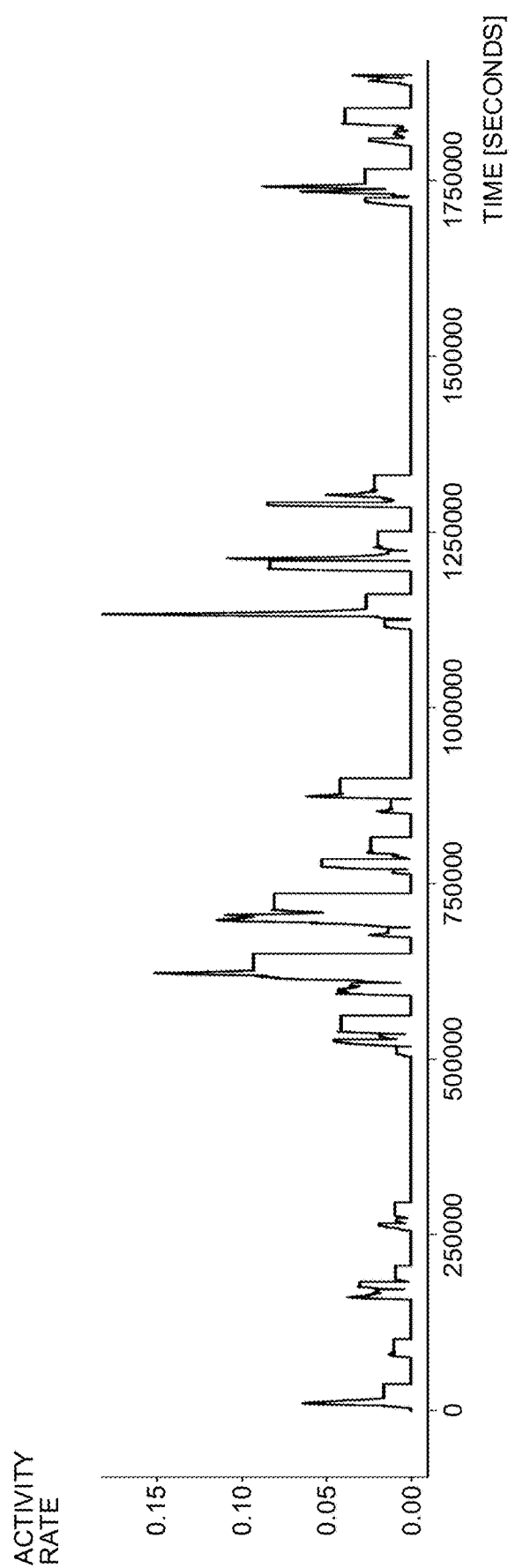
FIG. 8A depicts a second example an activity rate time series of a database user, according to embodiments of the invention.
Figure 8B:
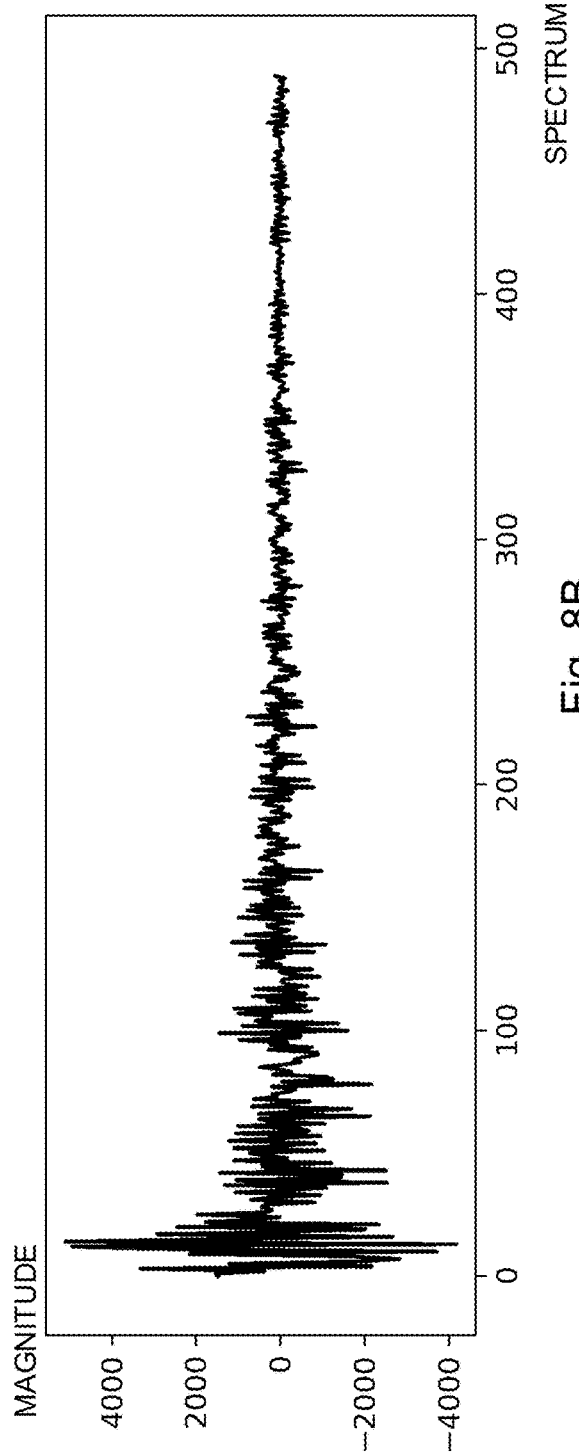
FIG. 8B depicts the Fourier transform of the second activity rate time series, according to embodiments of the invention.
Figure 8C:
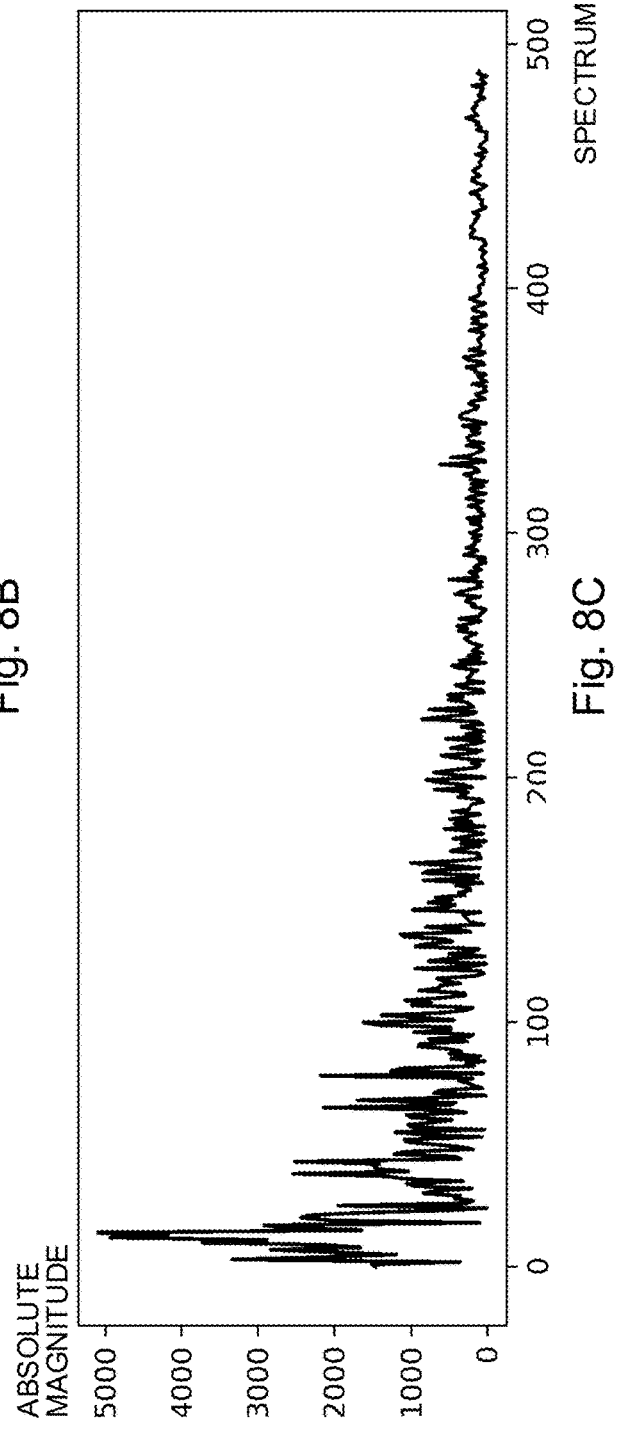
FIG. 8C depicts the absolute value of the Fourier transform of the second activity rate time series according to an embodiment of the invention.

Reference is now made to FIGS. 7-8 which provide examples of activity rate time series of database users, according to embodiments of the invention. FIG. 7A depicts an example a first activity rate time series of a database user and mean activity load feature extracted from the first activity rate time series. The square wave in FIG. 7A represents the working days in a week. As can be seen, the first activity rate time series is highly repetitive, which is a common behavior of an application user. FIG. 7B depicts the Fourier transform of the first activity rate time series, and FIG. 7C depicts the absolute value of the Fourier transform of the first activity rate time series, in which spikes 701 and 702 can be seen. FIG. 8A depicts a second example an activity rate time series of a database user, FIG. 8B depicts the Fourier transform of the second activity rate time series, and FIG. 8C depicts the absolute value of the Fourier transform of the second activity rate time series. As can be seen, the activity rate time series is not so repetitive, which is a common behavior of a direct user. According to embodiments of the invention, the features extracted from the first and second activity rate time series may be fed into a trained ML model, which may classify the respective database user.

FIG. 9 illustrates an example computing device according to an embodiment of the invention. Various components such as client server 310, security server 330, data source machine 320, user device 350 and other modules, may be or include computing device 700, or may include components such as shown in FIG. 9. For example, a first computing device 700 with a first processor 705 may be used to classify users of a database, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud"). For example, computing device 700 may be included in cloud computing environment 50 depicted in FIGS. 1, 2 and 3.

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Operating system 715 may be or may include any code segment designed and/or configured to provide a virtual machine, e.g., an emulation of a computer system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include software for classifying users of a database, according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Storage 730 may include or may store one or more databases including database 326, In some embodiments, some of the components shown in FIG. 9 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context.

Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for classifying users of a database, the method comprising:
   obtaining an activity rate time series describing activity level of a database user versus time;
   extracting at least one feature from the activity rate time series, wherein the at least one feature comprises a measure of repetition in the activity level;
   determining a type of the database user based on the extracted at least one feature; and
   wherein determining the type of the database user comprises determining if the user is a direct user or an application user, wherein the application user aggregates activity of multiple users of the application.

2. The method of claim 1, wherein the at least one feature further comprises at least one of a mean activity load and a percentage of the time in which the user is active.

3. The method of claim 2, wherein the measure of repetition in the user activity is calculated by:
   performing a Fourier transform on the activity rate time series to produce a transformed series;
   detecting spikes in the transformed series; and
   measuring a percentage of information in the transformed series which is included in the spikes.

4. The method of claim 3, wherein the spikes are detected by:
   applying a convolution with a smoothing kernel to the transformed series to produce a resultant series; and
   determining that a value in the transformed series is a spike if the resultant series is lower than the transformed series by a predetermined factor.

5. The method of claim 1, comprising:
   obtaining a plurality of labeled activity rate time series;
   training a machine learning model using the labeled activity rate time series; and
   using the trained machine learning model to determine the type of the user based on the extracted features.

6. The method of claim 5, wherein the machine learning model is a linear regression model.

7. The method of claim 1, comprising:
   applying a first security policy if the user is a first type of user and a second security policy if the user is a second type of user.

8. The method of claim 1, comprising:
   assigning a first significance level to security events associated with a first type of users and a second significance level to security events associated with a second type of user.

9. A method for determining a type of a user of a database, the method comprising:
   obtaining a time series describing an activity volume of the user versus time;
   extracting a plurality of features from activity rate time series, wherein at least one feature comprises a measure of repetitive behavior of the user;
   classifying user to user types based on the extracted feature; and
   wherein classifying the user to user types comprises determining if the user is a direct user or an application user, wherein the application user aggregates activity of multiple users of the application.

10. A system for monitoring of movement of data in a computer network, the system comprising:
    a memory; and
    a processor configured to:
      obtain an activity rate time series describing activity level of a database user versus time;
      extract at least one feature from the activity rate time series, wherein the at least one feature comprises a measure of repetition in the activity level;
      determine a type of the database user based on the extracted at least one feature; and
      wherein the processor is configured to determine if the user is a direct user or an application user, wherein the application uses the database user for aggregating activity of multiple users of the application.

11. The system of claim 10, wherein the at least one feature further comprises at least one of a mean activity load and a percentage of the time in which the user is active.

12. The system of claim 11, wherein processor is configured to calculate the measure of repetition in the user activity by:
    performing a Fourier transform on the activity rate time series to produce a transformed series;
    detecting spikes in the transformed series; and
    measuring a percentage of information in the transformed series which is included in the spikes.

13. The system of claim 12, wherein processor is configured to detect the spikes by:
    applying a convolution with a smoothing kernel to absolute values of the transformed series to produce a resultant series; and
    determining that a value in the transformed series is a spike if the resultant series is lower than the transformed series by a predetermined factor.

14. The system of claim 10, wherein processor is configured to:
    obtain a plurality of labeled activity rate time series;
    train a machine learning model using the labeled activity rate time series; and
    use the trained machine learning model to determine the type of the user based on the extracted features.

15. The system of claim 14, wherein the machine learning model is a linear regression model.

16. The system of claim 10, wherein processor is configured to:
   apply a first security policy if the user is a first type of user and a second security policy if the user is a second type of user.

17. The system of claim 10, wherein processor is configured to:
   assign a first significance level to security events associated with a first type of users and a second significance level to security events associated with a second type of user.

18. The system of claim 10, wherein the processor is further configured to determine if the user is a machine user.

* * * * *